United States Patent [19]

Dewan

[11] 4,415,846
[45] Nov. 15, 1983

[54] WOUND ROTOR MOTOR APPARATUS
[75] Inventor: Shashi B. Dewan, Toronto, Canada
[73] Assignee: Marathon Electric, Wausau, Wis.
[21] Appl. No.: 241,756
[22] Filed: Mar. 9, 1981
[51] Int. Cl.³ .............................................. A02P 5/40
[52] U.S. Cl. .................................... 318/732; 318/823
[58] Field of Search ................. 363/39; 318/761, 762, 318/808, 732, 731, 821–828

[56] References Cited

U.S. PATENT DOCUMENTS

| | | | |
|---|---|---|---|
| 3,403,318 | 9/1968 | Krauthamer | 363/37 |
| 3,699,416 | 10/1972 | Sloan et al. | 318/761 |
| 3,872,364 | 3/1975 | Hubner | 363/37 |
| 4,012,682 | 3/1977 | Carroll | 363/37 |

OTHER PUBLICATIONS

Shepherd et al., "Slip Power Recovery in an Induction Motor by the Use of a Thyristor Inventor" IEEE Transactions on Industry and General Applications, Vol. I GA-5, No. 1, Jan/Feb 1969, pp. 74–82.

*Primary Examiner*—David Smith, Jr.
*Attorney, Agent, or Firm*—Andrus, Sceales, Starke & Sawall

[57] ABSTRACT

A wound rotor motor apparatus includes an energy recovery circuit having a rectifier connecting the rotor circuit to a gated inverter having an input filter for return of rotor power to the three-phase power supply system. A voltage chopper circuit connects the rectifier to the recovery inverter and operates to establish and maintain a constant direct current voltage to the inverter regardless of motor speed. The voltage is greater than the line voltage and is returned at near unity power factor. The chopper circuit is dual gated thyristors. A first thyristor connects an inductor in series to the rectifier. The first thyristor is turned on at the chopper frequency and current flows through the inductor. A commutating thyrister in series with diode is connected in series with a first thyristor and a parallel and back-biasing diode. An inductor in series with a capacitor is connected across commutating thyristor and the inductor-capacitor junction is connected in series with a dropping resistor to the input of the inverter filter. Upon turn-on of the commutating thyristor, the LC circuit tries to ring and current flows through the back-bias diode and turns the first thyristor off. The inductor acts as a high voltage source to the inverter circuit and recharges the commutating capacitor. When the inverter is gated on, power is returned from constant high D.C. voltage supply to the A.C. Power supply.

15 Claims, 1 Drawing Figure

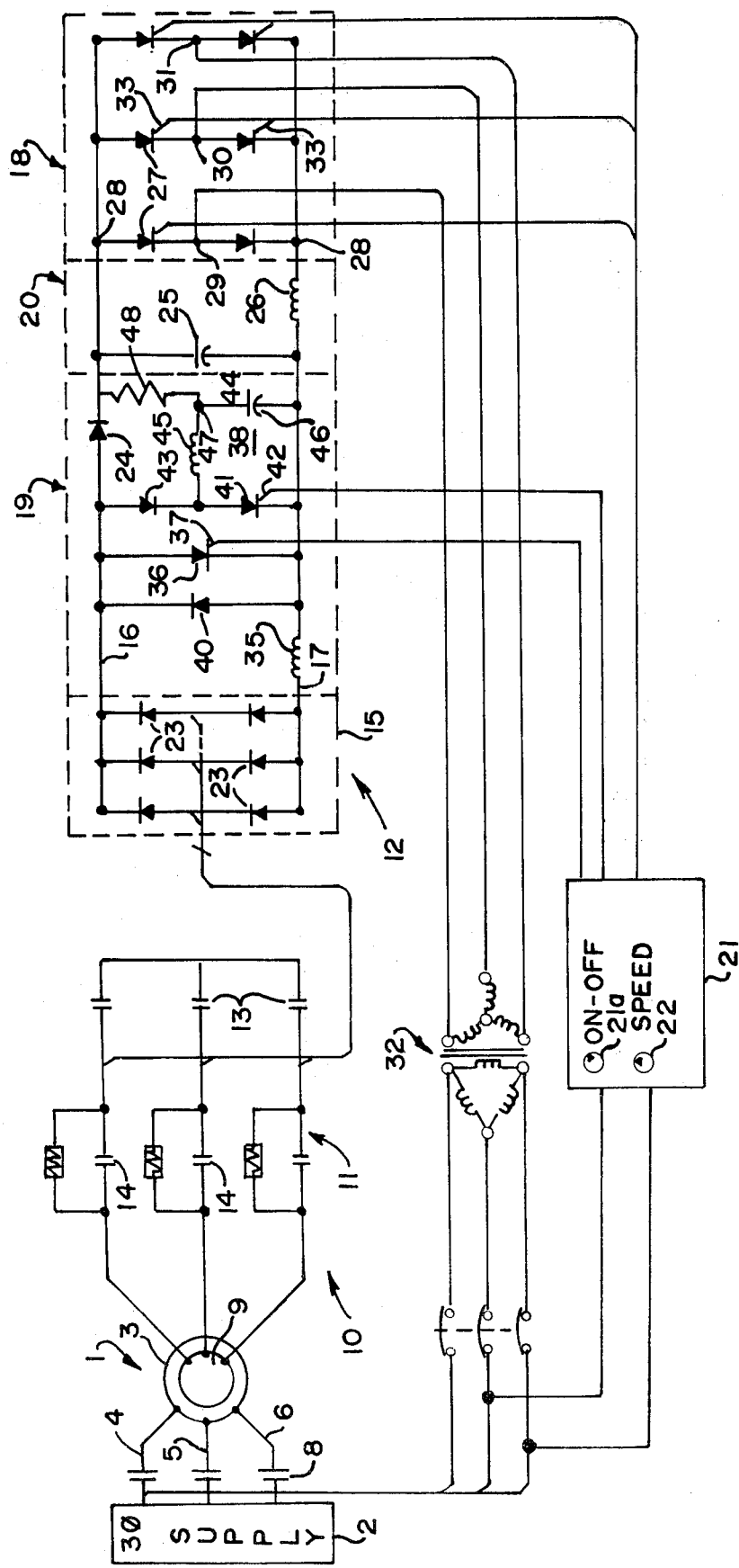

WOUND ROTOR MOTOR APPARATUS

BACKGROUND OF THE PRESENT INVENTION

This invention relates to a wound rotor motor apparatus and particularly to an energy recovery and control circuit connected to the rotor and to the incoming power supply.

Induction motors of a wound rotor construction are advantageously used in various industrial applications. The wound rotor induction motor of a three-phase construction is particularly adapted to large torque and high power requirements. In such a three-phase motor, the stator includes a three-phase winding connected to a three-phase alternating current power supply. The rotor is wound with a three-phase winding which is interconnected to a rotor load circuit for absorbing the energy associated with the inherent slip characteristic of wound rotor motors. Resistance elements may be connected into the rotor load circuit to absorb and/or dissipate the energy. This results in a relatively inefficient operation but has been and is used in many installations, particularly with switching means to insert and remove resistance so as to adjust the motor characteristic. For example, cranes, hoists, elevators and like devices may advantageously use wound rotor motors with a changeable resistance rotor circuit. A more efficient wound rotor motor system has been suggested, particularly since the development of solid state circuit elements, wherein the rotor energy is coupled back to the power system and thus least partially recovered. The level of the power feedback from the rotor to the stator circuits is selected to control the motor speed. This results in a more effective and efficient motor system. For example, U.S. Pat. No. 3,136,937 discloses a basic operating system wherein a full wave diode bridge is connected to the three-phase rotor winding of a wound rotor induction motor. The direct current output of the diode bridge is connected as the input to a gated inverter bridge, the output of which is connected to the three-phase power supply system. The inverter includes gated thyristors in each leg of the bridge, with pair of thyristors fired from a firing control circuit to feed power back to the power line during appropriate periods of the alternating current phase voltages on the several phase lines. For efficient transfer of power and maintaining proper motor operation under desirable power factor conditions, the thyristors are gated on at a fixed time during the corresponding voltage cycle of the A.C. phase supply. A gated thyristor is connected across the diode rectifier and controlled to bypass a part of the energy from the inverter back through the rotor circuit to control the motor speed. A control system in combination with a stabilizing circuit across the inverter for absorbing transient voltages is disclosed in U.S. Pat. No. 3,504,254.

Various other systems have been developed with various stabilizing and control circuits. Generally, the prior art systems have included expensive, large line capacitors for power factor correction. Although such prior art developments have been suggested and energy recovery systems have been satisfactorily used, the prior art devices have not therefore provided optimum energy recovery.

SUMMARY OF THE PRESENT INVENTION

The present invention is particularly directed to a wound rotor motor apparatus having an energy recovery circuit with a step-voltage means establishing an improved and more efficient energy recovery and control, and particularly creating recovery of the power as essentially unity power factor so as to eliminate the necessity for the usual power factor correction capacitors. The energy recovery circuit includes a rectifier connected to the rotor circuit with the output connected to the input of a gated inverter for return of rotor power to the three-phase power supply system energizing the motor stator. Generally in accordance with the present invention, a constant voltage control means which is preferably a gated chopper circuit is interposed and connects the rectifier to the recovery inverter and supplies an average constant direct current (D.C.) voltage to the inverter. In a typical three-phase motor operated from a nominal 460 volt supply, the step up voltage circuit may maintain a voltage of substantially 600 volts at the input of the inverter. In accordance with the invention, the voltage level is held constant for all motor speeds, with the voltage across the rectifying means adjusted to establish the desired speed at which the motor is to operate. The system with appropriate control of the inverter to maintain proper phase relationship provides an effective and more efficient motor operation.

More particularly in a preferred and particularly unique embodiment of the present invention, the voltage control means includes a chopper circuit having a series inductor connected between the rectifier and the inverter. A unidirectional conducting means, such as coupling diode, connects the output of the rectifier to the inverter. A gated switch means, such as a thyristor, is connected across the rectifier in series with the inductor and thus similarly across the input to the inverter. The thyristor is periodically turned on at a predetermined constant frequency, and in corresponding timed relation a high current path is established through the inductor and the rotor rectifier. A commutating circuit is connected in parallel with the gated step-up voltage thyristor to establish a back bias across the latter. The commutating circuit includes a second or commutating gated switch means, such as a commutating thyristor in series with an unidirectional conducting element in parallel with the step-up thyristor and a reversely connected back-biasing diode. An LC circuit consisting of an inductor in series with a capacitor is connected across the main terminals of the commutating thyristor. The junction of the inductor and the capacitor is preferably connected in series with a dropping resistor to the input of the Inverter. The commutating thyristor is actuated in predetermined times relation after turn-on of the speed control thyristor. Prior to turn-on of the commutating thyristor, the commutating capacitor is charged to the inverter input voltage and upon turn on of the commutating thyristor, the LC circuit tries to ring, and conducts through the back-bias diode across the speed control thyristor and positively turns the thyristor off. The stored energy in the inductor now flows through the output coupling diode to the inverter and through the commutating capacitor, thereby charging the capacitor. The current tends to overcharge the capacitor slightly which will discharge through the inverter circuit and return to the constant high voltage input to the inverter. The inductor establishes a voltage substantially above the line voltage and provides an average and essentially constant D.C. input voltage to the inverter substantially above the line voltage. A filter circuit is connected between the chopper circuit and the inverter to essentially remove the variation in the voltage at the inverter input. When the inverter is gated on, power is returned from the constant voltage supply to the power supply. The level of the rotor voltage is determined by controlling the time of conduction of the step-up voltage thyristor which is turned on at a fixed frequency and off at a speed related delay time so as to produce a constant frequency variable width control, in the preferred embodiment.

Although such a thyristor controlled embodiment has been found to provide particular satisfactory results, any other voltage control circuit operable to maintain the output voltage from the rotor bridge rectifier at a constant level for all motor speeds may be used within the teaching of this invention.

The chopper circuit providing a constant voltage level input to the inverter in combination with the proper firing of the inverter provides a near unity power factor operation with a highly efficient energy recovery and motor operation.

DESCRIPTION OF THE ILLUSTRATED DRAWING FIGURES

The drawing furnished herewith illustrates a preferred construction of the present invention in which the above advantages and features are clearly disclosed as well as others which will be readily understood from the following description.

The drawing furnished herewith is a partial schematic diagram of a wound rotor induction motor incorporating an energy recovery circuit constructed in accordance with the teaching of the present invention.

DESCRIPTION OF THE ILLUSTRATED EMBODIMENT

Referring to the drawing, a wound rotor induction motor 1 is schematically shown. A three-phase voltage supply 2 is connected to the stator 3 of the motor 1 by the usual three-phase connecting lines 4, 5 and 6. The power supply 2 may be the usual 460 volt three-phase A.C. power distribution system available in the United States. The stator 3 is shown connected to the power supply lines 4-6 with a suitable primary contactors and circuit brakers 8. The motor 1 has a three-phase wound rotor 9 and a rotor circuit 10 connected to the rotor 7 by any suitable means to conduct the rotor current. In the illustrated embodiment, the circuit 10 includes a conventional resistor load 11 and an energy recovery load circuit 12. The resistor load circuit 11 is shown as an one optional enengency operation circuit and is selectively connected in circuit by contactors 13. The energy recovery load circuit 12 is the primary circuit and is connected in circuit by contactors 14. Thus, the rotor circuit 10 may be connected to the rotor 9 by suitable slip rings, not shown, or may be directly connected and mounted for rotation with the rotor 9. The energy recovery circuit 12 includes a diode bridge rectifier 15 to establish a full wave D.C. voltage and current at a positive line 16 and a negative return line 17. The rectifier lines 16 and 17 are connected as the input to a full wave inverter thyrister 18 which is connected to return power to the A.C. supply system, generally in accordance with previous energy recovery system. In accordance with a teaching of the present invention, however, a step-up voltage chopper circuit 19 connects the output of the rotor rectifier 15 to the inverter 18 and functions to step up the voltage to a constant D.C. voltage level which is applied to the input of the inverter 18. A filter unit 20 is preferably interposed between the chopper circuit 19 and the inverter 18. The chopper circuit 19 particularly converts the variable direct current (D.C.) output voltage of the full wave rectifier 15 and converts such variable voltage into an essentially constant D.C. output voltage of a relatively high voltage level applied to the input of the inverter 18. The high voltage input is fed back to each phase of the three-phase lines 4–6 in appropriate timed relation such phases which results in the supply system operating at essentially or very near unity power factor. Thus, the power factor is thus naturally or inherently held appropriately near a power factor of one such that conventional power factor correction capacitors connected to the A.C. power lines 4–6, are not necessary.

A control unit 21, which is shown in block diagram, provides appropriate operation of the several contactors to connect the motor 1 for operation and to the energy recovery circuit 12 for controlling the power recovered to control the motor speed. The control unit 20 is shown connected to the incoming three-phase power supply across two phase lines to provide 120 voltage source. In addition to various meters, indicating means and the like, the control unit 21 includes a main on-off control 21a and a speed control 22 which are manually operable, but which of course may be incorporated in any suitable automated system, feedback system or the like. The control unit 21 may be of any known or desired construction and a detailed illustration and description has not been included. Such control units can be readily provided by those skilled in the art.

More particularly, the bridge rectifier 15 is shown as the well known three-phase full wave diode bridge unit having six diodes 23 interconnected to define the input terminal 24 and polarized to conduct the three-phase output from the winding of rotor 7 and developing a three-phase full-wave interfered direct current output at output lines 16 and 17. The positive D.C. line 16 is connected by a series coupling diode 24 to the filter 20 and thereby to inverter 18. In the illustrated embodiment of the invention, filter circuit 20 is connected between the coupling 24 and the inverter to further smooth and remove the ripple component present in the D.C. voltage at lines 16 and 17 and presents an essentially constant, high level voltage at the input terminals of the inverter 18. The filter 20 is shown as a well known circuit including a shunt capacitor 25 connected between the positive and negative input lines 16 and 17. An inductor 26 is connected in series in the return line 17 between the capacitor 25 and the inverter 18.

The inverter is shown as the well known three-phase full wave gated recovery bridge having six thyristor 27 connected in a known configuration with input terminals 28 connected to the D.C. lines and with three output terminals 29, 30 and 31 connected by corresponding output lines to the power lines 4, 5 and 6. Each thyristor 27 forms a leg of the bridge and includes a gate 33 to control firing thereof. The thyristors 27 are fired at a constant frequency to return power to the three-phase supply lines 4–6. A three-phase transformer 32 is shown connected in the three-phase output lines to isolate the rotor energy recovery circuit from the power supply lines 4–6. For example, the transformer may be a 25 KVA transformer having a 480 volt primary coupled to a 480 volt secondary. The transformer 32 may be necessary to match the secondary or rotor voltage of motor 1 to the voltage of the A.C. supply 2. In those instances where the motor 1 is properly matched to the A.C. power supply 2, the transformer 32 can of course be eliminated.

The recovery inverter as noted is of a conventional construction with six thyristors 27 connected in a bridge configuration. The thyristors 27 are paired and gated on to provide current flow from the bridge to the three-phase lines 4-6, with proper sequence and syncronization to the three-phase A.C. supply for returning of the power from the rotor circuit to the A.C. power supply. The control unit 21 includes any suitable means, such as known pulse signal circuits operable in synchronism with the supply 2 to energize the gates 33 to fire the thyristors 27 into conduction. As such gating systems are known and as such can be readily provided by those skilled in the art, detailed illustration has not been given. For example, U.S. Pat. No. 3,515,969 discloses a firing circuit for firing an invertor bridge in a predetermined sequence with respect to the phases voltages of the incoming power supply to appropriately fire the circuit during the positive half cycle of the corresponding power supply phase voltage. The fired thyristor 27 continues to conduct until such time as the power supply voltages back bias the thyristor and turns the thyristor off. Generally in the present invention the firing circuit is set to fire the inverters at the 50 to 60 electrical degrees. Although it is desirable to fire relatively late in the cycle because of the power factor increases toward unity, the inverter thyristor 27 may not be properly commutated off. If the firing angle is decreased toward zero electrical degrees, the power factor of course drops accordingly. The inventor has found that firing at 50 to 60 electrical decrease produces essentially unit power factor motor operation while maintaining reliable turn off the inverter thyristors 27.

The chopper circuit 19 is also shown as a gated thyristor circuit. The illustrated embodiment is of a constant frequency and variable width type. The circuit 19 includes an energy storage inductor 35 connected in the D.C. return line 17 between the full wave diode bridge 15 and the filter 20. A speed control gated switch means, shown as thyristor 36, is connected directly between the positive D.C. line 16 and the negative D.C. line 17 to the positive side of the energy storage inductor 35. The thyristor 36 includes a gate 37 connected to control unit 21. When the thyristor 36 is gated on, current flow from the diode bridge 15 is directly through the inductor 35, with energy being stored within the inductor 35. Thyristor 36 is gated off by a gated commutating circuit 38, at which time the inductor 35 forms a high voltage source coupled to the filter 20 and inverter 18 to establish the constant high voltage supply. Thyristor 36 is gated from the control unit 20 at a periodic fixed frequency, for example, at 500 cycles per second. The thyristor 36 is connected off during each cycle. The thyristor 36 is thus turned on and off to control the proportion of power returned to the supply and recirculated through the inductor 25 to produce the high voltage input to the invention. The control firing of the commutating circuit 38 provides a means to adjust the speed of the motor 1 while maintaining the constant output voltage, and thereby essentially unity power factor operation. The commutating circuit operates as follows.

An oppositely polarized, turn-off diode 40 is connected in parallel with the main circuit of the thyristor 36. The diode 40 is polarized to conduct from the negative D.C. line 17 to the positive D.C. line 16 and thus in the opposite direction from that of the thyristor 36. When an appropriate current flows through the diode 40, a voltage drop is created across the diode sufficient to back bias and positively turn off the thyristor 36. Current is supplied to the circuit and particularly to the diode 40 from the commutating circuit 38 which is also connected across the D.C. lines 16 and 17.

The illustrated commutating circuit 38 includes a commutating gated switch means which is again shown as a thyristor 41 having a gate 42 connected to control unit 20. The commutating thyristor 41 is connected in series with a correspondingly polarized diode 43 in parallel with the speed control thyristor 36. An LC branch circuit 44, including an inductor 45 in series with a capacitor 46 connected directly in parallel and across the commutating thyristor 41, and thus across the D.C. lines 16 and 17 in series with the forward biased diode 43. The capacitor 46 is connected directly to the negative or return line. A junction or common node 47 of the inductor 45 and the capacitor 46 is connected by a coupling time constant resistor 48 to the inverter input, and in particular to filter 20 to the output side of the D.C. coupling diode 24.

The commutating circuit 38 functions to store energy in the LC circuit branch circuit 44, with the commutating thyristor 41 off. When the commutating thyristor 41 is turned on, the capacitor 46 discharges through the inductor 45 and the thyristor 41, to reverse the charge on the capacitor 46 at which time the commutating thyristor 41 turns off. The circuit attempts to ring with current reversing, which is blocked by the thyristor 41. The reversely charged capacitor 46 now discharges and current flows through the back-bias or turn-off diode 40, with such current flow developing a turn-off voltage across the diode 40 speed control thyristor 36, which is thereby turned off. This terminates current flow from the bridge rectifier 15 through the inductor 35. The inductor 35 inherently tends to maintain the current flow and develops the necessary voltage to discharge the stored energy therein. The voltage arises above that of the diode bridge 15 with the current flowing through the diode bridge 15, the positive D.C. line 16 and the coupling diode 24, through the filter 20 to input of the inverter circuit and returning through the return line 17 to the inductor 35. Simultaneously, current flows through the commutating diode 43 and the LC branch 14 to charge the capacitor 46. As the result, the capacitor 44 is again charged to a voltage slightly above the inverter input voltage. The capacitor voltage decreases to the inverter input voltage through the coupling resistor 48.

At the predetermined and fixed frequency, the speed control thyristor 36 is again gated on while commutating thyristor 41 remains off. This resets the circuit and the above cycle is repeated.

The turning on of the speed control thyristor at fixed chopped frequency in combination with the turn-on of the commutating thyristor at a controlled frequency determines the average D.C. voltage supplied back to the rotor circuit. Thus, the output voltage is equal to the inverter voltage times the ratio of the conducting periods of the speed control thyristor 36 relative to the chopping frequency. The fixed chopping frequency may use any suitable fixed frequency pulse source with the commutating signal derived from a suitable pulse source having means controlled by input 22 to adjust its firing during each chopper period and thereby such ratio. Thus, the duty cycle of the thyristor 36 is increased to increase motor speed. To produce maximum speed the chopper frequency can be reduced as the maximum duty cycle is reached. This in turn establishes the motor speed.

The commutating sequence of the illustrated commutating circuit 38 is more particularly described as follows.

Assume the speed control thyristor 41 is conducting and D.C. average current therefore flows through the thyristor 41, which is assumed constant during a commutation period. When the commutating thyristor 41 is gated on to commutate the speed control thyristor 36, the commutation begins with an initial operating mode as follows. Thus, the commutating capacitor 44 is charged to the constant D.C. voltage level. The capacitor 46 completely discharges through the thyristor 41 with a current having a value of $E = C/L$. The capacitor voltages thus reach a minus E volts as a result of the ringing current. At this point in time, the circuit mode has the speed control thyristor 36 still conducting, and the current of capacitor 46 now circulates through the circuit of diode 43 until the capacitor current equals the D.C. bridge current, at which time the current through the thyristor 36 goes to zero. At this time, diode 40 begins to conduct. The duration of this mode exists for a period depending upon the LC time constants and generally a period $t^*$ equal to LC SIN$-1$ ($w_r$L I/E), wherein $w_r$ is equal to one LC. At the end of this mode or period and with the initiation of conduction of diode 40, the current of capacitor 46 is now carried by diode 40 and diode 42 for a third interval $t_g$ equal to LC$-2t^*$. This is followed by a fourth mode or period which is of a very small duration and during which period only the diode 43 conducts until the charge on capacitor 46 reaches the input voltage of the inverter. At that time, both the diode 43 and the coupling diode 24 conduct the D.C. current from the inductor 35 in a fifth mode or period, until such D.C. current drops to zero. At this time, the coupling diode 24 carries the full load current and the capacitor 46 is slightly overcharged and only the coupling diode 24 conducts. During the remainder of the fixed chopping period, that is, until the thyristor 36 is again turned on, the overcharged capacitor 46 discharges to the input voltage of the inverter 18 through the coupling resistor 28. The level of the overcharge on the capacitor is generally equal to the constant voltage E times a current-related factor which equals I C/L.

The step-up chopper circuit 19 thus constitutes a special connecting link between the three-phase diode bridge 15 and the recovery bridge 18. The chopper circuit 19 converts the variable D.C. volage appearing across the diode bridge 15 to a constant inverter voltage, typically 600 volts which is fed to the recovery bridge 18 regardless of motor speed. The average output voltage appearing across the bridge rectifier 15 is determined by the ratio of the predetermined constant voltage times the proportion of the chopping frequency period (T) that the speed control thyristor 36 conducts, or $W_{15} = E\ T_{on}/T$. This average voltage appearing across the motor rotor 9 also ultimately determines the speed of the induction motor. Thus, in order to maintain the constant output voltage with a varying output from the rectifier, the duty cycle of the thyristor 36 is varied by varying of the operation of the commutating circuit 38 to adjust the rotor voltage to a desired motor characteristic while maintaining the high level constant output voltage.

Thus, as applied in a typical motor system drive from the 3∅ 460 volts power distribution system, the D.C. voltage may be typically 600 volts D.C., with the firing of the gated switch means of the commutating circuit controlling the voltage across the rotor rectifying means and thereby the ultimate operating speed of the motor without changing of such inverter input voltage.

Although not essential various snubber resistor-capacitor circuits, not shown, may be connected in parallel with the several diodes and thyristors to prevent abnormal voltage rises across the solid state components.

The illustrated chopper circuit 19 is shown including thyristors because silicon controlled rectifiers of the necessary power capacitor are readily available. Any other suitable gated switching means might of course be used which can provide a similar operation to produce the constant level output voltage. Other suitable constant voltage controls which permit simultaneous control of the loading of the rotor may of course be used in the present invention. The dual thyristor chopper circuit is a preferred system for practical implementation of the invention with the use of suitable known control techniques and components. The dual control allow varying the chopper frequency and the duty cycle to provide a maximum speed control with the constant voltage input to the inverter. Thus, the chopper frequency may be reduced as the maximum duty cycle is approached or reached to produce a maximum speed of the wound rotor motor. These and other similar meanss, as well as other circuit systems may be provided within the basic teaching of the present invention of establishing recovery of the rotor or secondary energy at a constant voltage regardless of motor speed, and thereby permitting an essentially unity power factor motor operation without the necessity of the usual commutating capacitors or other means.

Various modes in carrying out the invention are contemplated as being within the scope of the following claims, particularly pointing out and distinctly claiming the subject matter which is regarded as the invention.

I claim:

1. A wound rotor motor control apparatus for a wound rotor motor having a stator adapted to be connected to an alternating current supply means and a rotor, comprising a rectifying means adapted to be connected to the rotor to establish a direct current output, a phase controlled inverter means connected to said rectifying means and having output means adapted to be connected to said alternating current supply means to return the power to the supply means, and voltage control means including a voltage chopper circuit means connected to the rectifying means and said inverter means to establish a predetermined essentially constant voltage to said inverter means for all motor speeds and to return power to said supply means at essentially unity power factor.

2. The motor control apparatus of claim 1 wherein said control means establishes a constant voltage of a level substantially greater than the supply voltage.

3. The wound rotor motor control apparatus of claim 1 wherein said voltage control means includes an inductor means in series with the output of said rectifying means and said chopper circuit means connected to alternately connect and disconnect the inductor means directly across the rectifying means and to said inverter means to establish said predetermined constant voltage to said inverter means and to establish a predetermined motor speed.

4. The wound rotor motor control apparatus of claim 3 wherein said chopper circuit means has a constant frequency and variable width output, and means to adjust the width of said output to control the speed of said motor.

5. The wound rotor motor control apparatus of claim 1 wherein said control means includes an inductor means, a first gated switch means connected across the rectifying means in series with said inductor means, means to periodically turn on said gated switch means, and a commutating circuit including a second gated switch means connected to turn said first gated switch means off.

6. The motor control apparatus of claim 5 including means to control the gating of said second gated switch means to control the motor speed.

7. The motor control apparatus of claim 5 including means to increase the duty cycle for increasing motor speed and thereafter reducing the chopper frequency to produce maximum motor speed.

8. A wound rotor motor apparatus, comprising a wound rotor motor having a stator adapted to be connected to an alternating current supply means and a rotor, a rectifying means connected to the rotor to establish a direct current output, a phase controlled inverter means connected to said rectifying means and having output means adapted to be connected to said alternating current supply means to return the power to the supply means, and a step-up voltage control means connected to the rectifying means and including a series connected inductor means and a chopper circuit means connected to establish a predetermined constant voltage to said inverter means.

9. The wound rotor motor apparatus of claim 8 wherein said chopper circuit means has a constant frequency, variable width output, and means to control the width of said output and thereby control the speed of the motor for said constant output voltage.

10. The wound rotor motor apparatus of claim 8 wherein said chopper circuit means includes a first controlled thyristor means connected in series with said inductor means across said rectifying means, a commutation controlled thyristor means and a parallel LC branch connected in parallel with said first controlled thyristor means, and control means to fire said thyristor means in alternate sequence to maintain said voltage level.

11. The wound rotor motor apparatus of claim 10 wherein said control means periodically turns said first thyristor means on at a constant frequency and said commutating thyristor means on to establish a constant frequency variable pulse width control to control the speed of said motor.

12. The wound rotor motor apparatus of claim 8 wherein said control means includes a first gated switch means connected across said rectifying means in series with said inductor means, means connected to switch means on at a constant chopping frequency to turn said periodically establish current flow through said inductor means, a commutating gated switch means, a unidirectional conducting means connected in series with said commutating gated switch means in a branch circuit connected in parallel with said first gated switch means, a unidirectional conducting means connected in parallel with said first gated switch means and operable to turn said first gated switch means off, a unidirectional conducting means connecting said rectifying means to said inverter means, a commutating inductor, a capacitor connected in series with said commutating inductor across said commutating gated switch means.

13. The motor system apparatus of claim 12 having a resistor connected to said commutating inductor and to said inverting means to set said capacitor to the output voltage level prior to turn-on of said first gated switch means.

14. The wound rotor motor apparatus of claim 8 wherein said rectifying means is a full wave diode bridge rectifier, said control means includes a first thyristor connected across said rectifier in series with said inductor means, a coupling diode connecting said rectifier to said inverter means, said thyristor having an input gate, means connected to said gate to turn said thyristor on at a constant chopping frequency to establish current flow through said inductor means, a commutating thyristor, a diode connected in series with said commutating thyristor in a branch circuit connected in parallel with said first thyristor, a commutating diode connected in parallel with said first thyristor and polarized to oppositely conduct, a commutating inductor, a capacitor connected in series with said commutating inductor across said commutating thyristor, and a resistor connected to the output side of the coupling diode and to said inductor to set said capacitor to the output voltage level.

15. The motor apparatus of claim 14 includes a control unit connected to control the firing of said first thyristor at a selected chopper frequency and said commutating thyristor at a selected duty cycle frequency to conjointly control the motor speed.

* * * * *

UNITED STATES PATENT AND TRADEMARK OFFICE
CERTIFICATE OF CORRECTION

PATENT NO. : 4,415,846

DATED : November 15, 1983

INVENTOR(S) : SHASHI B. DEWAN

It is certified that error appears in the above-identified patent and that said Letters Patent are hereby corrected as shown below:

| | | |
|---|---|---|
| Column 2, | line 51, | Delete "Inverter" and substitute therefor ---inverter--- |
| Column 2, | line 55, | Delete "turn on" and substitute therefor ---turn-on--- |
| Column 3, | line 45, | Delete "brakers" and substitute therefor ---breakers--- |
| Column 3, | line 51, | Delete "energency" and substitute therefor ---emergency--- |
| Column 3, | line 62, | Delete "thyrister" and substitute therefor ---thyristor--- |
| Column 5, | lines 9-10, | Delete "syncronization" and substitute therefor ---synchronization--- |
| Column 5, | line 20, | Delete "phases" and substitute therefor ---phase--- |
| Column 8, | line 32, | Delete "meanss" and substitute therefor ---means--- |
| Column 9, CLAIM 10 | line 51, | After "said" insert ---first controlled thyristor means and said commutation controlled--- |
| Column 10, CLAIM 12 | line 10, | After "to" insert ---turn said--- |

UNITED STATES PATENT AND TRADEMARK OFFICE
CERTIFICATE OF CORRECTION

PATENT NO. : 4,415,846

DATED : November 15, 1983

INVENTOR(S) : SHASHI B. DEWAN

It is certified that error appears in the above-identified patent and that said Letters Patent are hereby corrected as shown below:

Column 10, line 11, After "to" delete ---turn said---
CLAIM 12

Signed and Sealed this

Fourteenth Day of August 1984

[SEAL]

*Attest:*

GERALD J. MOSSINGHOFF

*Attesting Officer*     *Commissioner of Patents and Trademarks*